(12) United States Patent
Derbeko et al.

(10) Patent No.: US 9,134,914 B1
(45) Date of Patent: Sep. 15, 2015

(54) DEDUPLICATION

(71) Applicant: EMC Corporation, Hopkinton, MA (US)

(72) Inventors: Philip Derbeko, Modiin (IL); Assaf Natanzon, Tel Aviv (IL); Anat Eyal, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 13/727,773

(22) Filed: Dec. 27, 2012

(51) Int. Cl.
*G06F 7/00* (2006.01)
*G06F 3/06* (2006.01)
*G06F 17/30* (2006.01)

(52) U.S. Cl.
CPC ........ *G06F 3/0641* (2013.01); *G06F 17/30109* (2013.01)

(58) Field of Classification Search
CPC ................................................. G06F 17/30109
USPC .......................................................... 707/694
See application file for complete search history.

(56) References Cited

U.S. PATENT DOCUMENTS

| | | | |
|---|---|---|---|
| 2002/0184333 A1* | 12/2002 | Appelman | 709/217 |
| 2009/0030997 A1* | 1/2009 | Malik | 709/206 |

\* cited by examiner

*Primary Examiner* — Ajith Jacob
(74) *Attorney, Agent, or Firm* — Krishnendu Gupta; Joseph D'Angelo

(57) ABSTRACT

A method, system, and computer program product comprising determining if a file is greater than a predetermined size, based on a positive determination that the file is greater than the predetermined size, searching for an associated signature file for the file, and if the associated signature file is found for the file, perfecting some or all the signatures from the associated signature for the file to the cache.

20 Claims, 10 Drawing Sheets

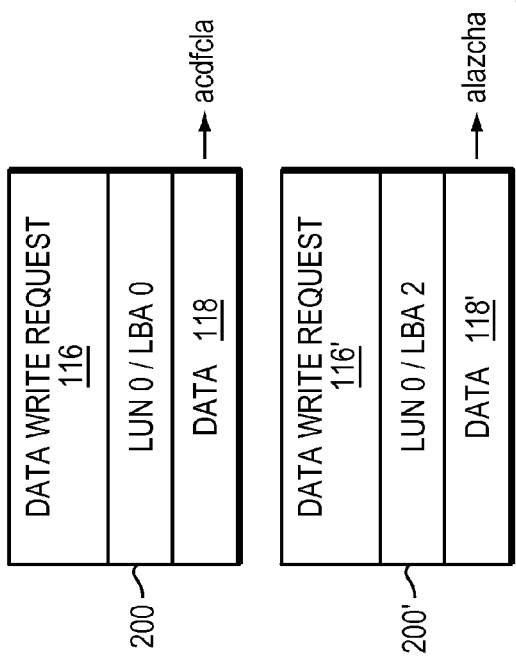
FIG. 3A
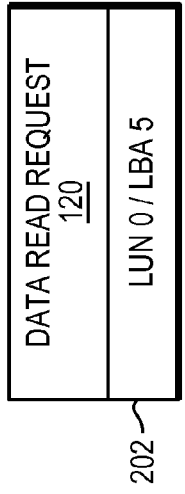
FIG. 3B
FIG. 3C

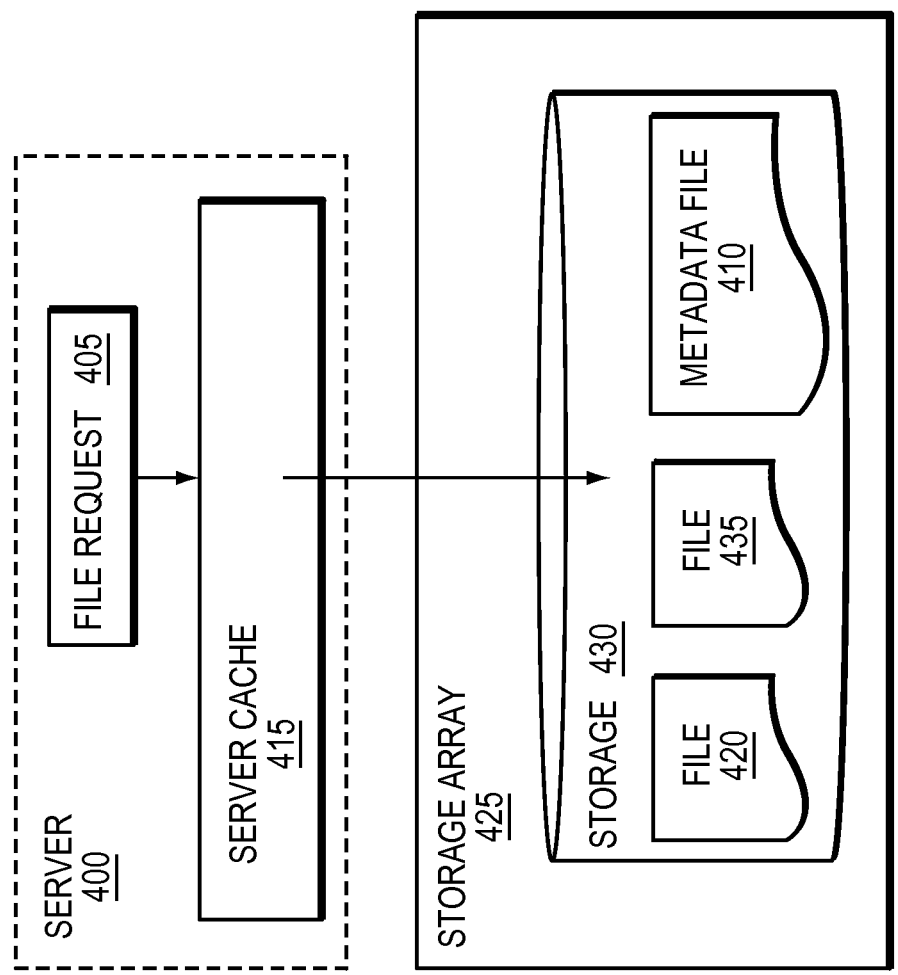

DEDUPLICATION

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY

A method, system, and computer program product comprising determining if a file is greater than a predetermined size, based on a positive determination that the file is greater than the predetermined size, searching for an associated signature file for the file, and if the associated signature file is found for the file, perfecting some or all the signatures from the associated signature for the file to the cache.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 3a is a diagrammatic view of a data write request for use with the data caching process of FIG. 1, in accordance with an embodiment of the present disclosure;

FIG. 3b is a diagrammatic view of a data read request for use with the data caching process of FIG. 1, in accordance with an embodiment of the present disclosure;

FIG. 3c is a diagrammatic view of a content directory for use with the data caching process of FIG. 1, in accordance with an embodiment of the present disclosure;

FIG. 4 is a simplified illustration of an server, a metadata file, and a storage array, in accordance with an embodiment of the present disclosure;

DETAILED DESCRIPTION

Figure 1:
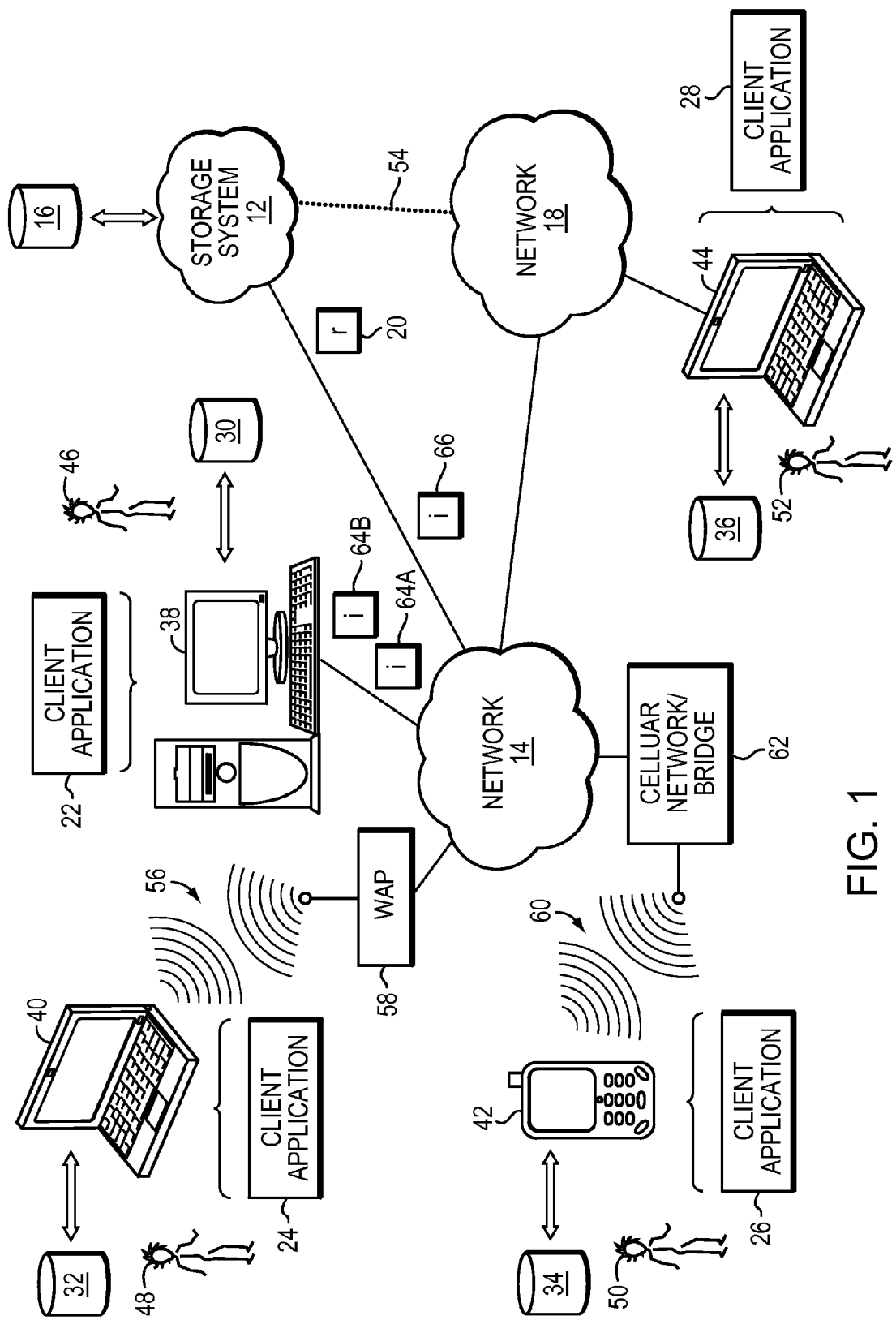
FIG. 1 is a diagrammatic view of a storage system and a data caching process coupled to a distributed computing network, in accordance with an embodiment of the present disclosure.

Generally, Data deduplication may refer to associating signatures with chunks of data. Conventionally, data deduplication may enable redundant pieces of data to be stored once on a back-up system although the same data may appear multiple times in an application or production environment. Usually, when data is to be stored, a signature is calculated for the data and, if that signature exists, the signature or a pointer to the signature may be stored instead of the data itself. Typically, however, small chucks of data may be used to calculate the signatures because of the overhead of calculating the signature. Yet, some application may use large files. Conventionally, applications such as Hyper-V and VMWare may keep virtual machines and their disk images in files. Generally, most of the content of these large files is rarely changed.

In certain embodiment, de-duplication signatures for such large files may be calculated. In most embodiments, once the signature is calculated, it may be reused later. In some embodiments, the calculated signature for large files may be stored in an "attached" meta-data file.

In particular embodiments, when a file is open, a check may be performed to determine whether the file is large enough to have an attached signatures file. In most embodiments if the file is large enough, signatures from a meta-data file may be read. In some embodiments, if the signatures are not in a cache, the signatures may be loaded into a cache structure. In further embodiments, a determination may be made if the data to be accessed has an associated signature. In most embodiments, if accessed or pre-fetched data has a signature, then it does not have to be calculated again. In these embodiments, the CPU load may be lowered by not having to recalculate the signature. In some embodiments, data with the same signature may be identified from the file and may not need to be read again.

In further embodiments, calculated signatures not found in a meta-data file or of the data that was updated may be added to the meta-data file. In certain embodiments, a meta-data file may be updated once every n writes or on every write. In most embodiments, deduplication may be faster and more read hits may be identified. A description of Data Deduplication may be described in the wholly co-owned patent titled "EFFICIENT DATA STORAGE SYSTEM" and with U.S. Pat. No. 7,305,532, which is hereby incorporated by reference.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to the example embodiment of FIG. 1, there is data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

In the embodiment of FIG. 1, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

In the example embodiment of FIG. 1, the instruction sets and subroutines of data caching process 10, which may be stored on storage device 16 included within storage system 12, may be executed by one or more processors and one or more memory architectures included within storage system 12. Storage device 16 may include but is not limited to: a hard disk drive; a tape drive; an optical drive; a RAID device; a random access memory (RAM); a read-only memory (ROM); and all forms of flash memory storage devices. Network 14 may be connected to one or more secondary networks (e.g., network 18), examples of which may include but are not limited to: a local area network; a wide area network; or an intranet, for example.

In the embodiment of FIG. 1, various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

In the embodiment of FIG. 1, the instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. In other embodiments, examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown). In the example embodiment of FIG. 1, users 46, 48, 50, 52 may access storage system 12 directly through network 14 or through secondary network 18. Further, storage system 12 may be connected to network 14 through secondary network 18, as illustrated with link line 54.

In the embodiment of FIG. 1, the various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

In the embodiment of FIG. 1, the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection. Client electronic devices 38, 40, 42, 44 may each execute an operating system, examples of which may include but are not limited to Microsoft Windows™, Microsoft Windows CE™, Redhat Linux™, or a custom operating system.

Figure 2:
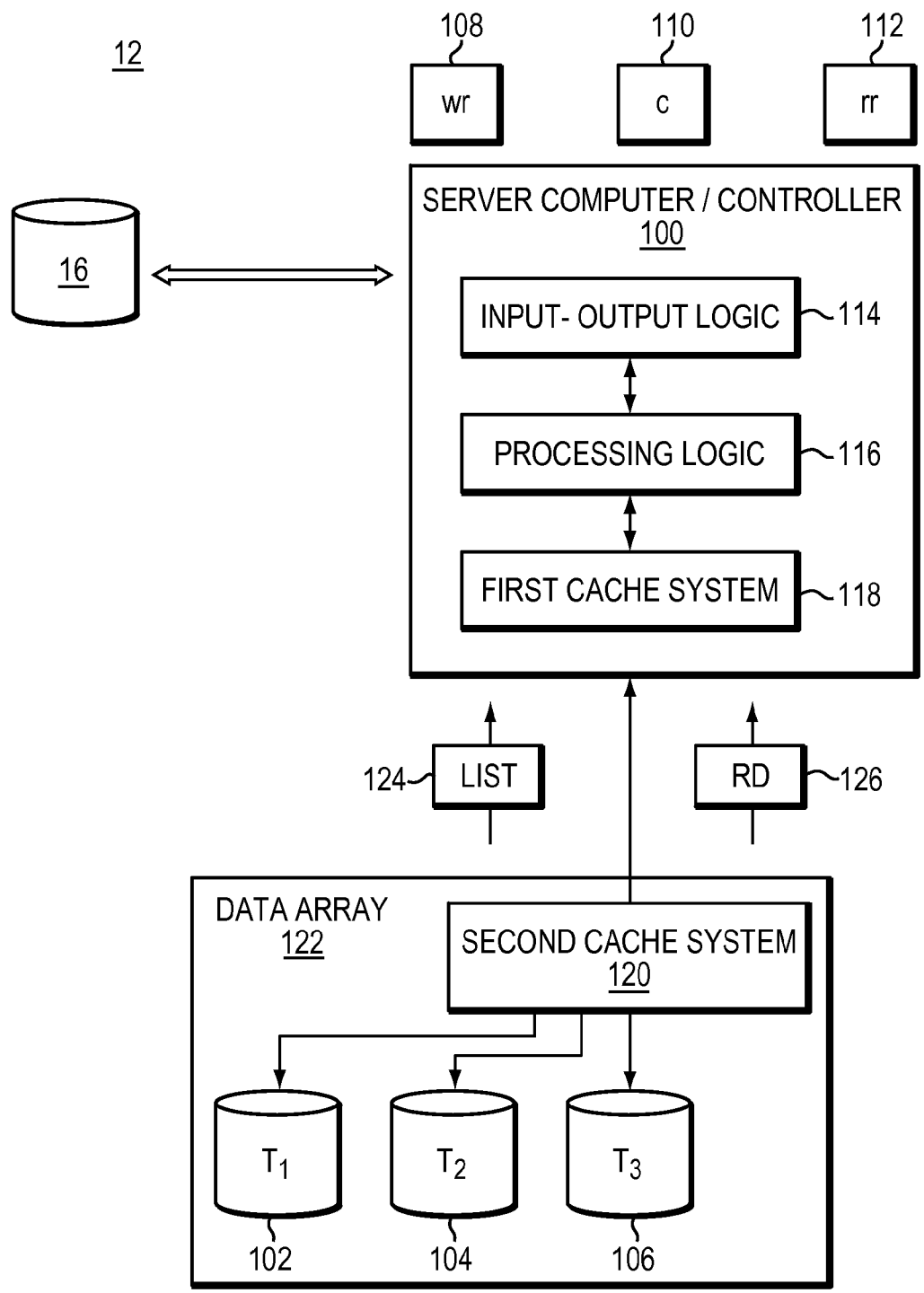
FIG. 2 is a diagrammatic view of the storage system of FIG. 1, in accordance with an embodiment of the present disclosure.

Data Caching Process:

Referring also to the example embodiment of Figure FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

In the example embodiments of FIGS. 1 and 2, storage targets 102, 104, 106, 108 are discussed above as being configured in a RAID 0 or RAID 1 array, this is for illustrative purposes only and is not intended to be a limitation of this disclosure, as other configurations are possible. In other embodiments, storage targets 102, 104, 106, 108 may be configured as a RAID 3, RAID 4, RAID 5 or RAID 6 array.

In the example embodiments of FIGS. 1 and 2, storage system 12 is shown to include four storage targets (e.g. storage targets 102, 104, 106, 108), for illustrative purposes only and is not intended to be a limitation of this disclosure. In other embodiments, the number of storage targets may be increased or decreased depending upon e.g. the level of redundancy/performance/capacity required.

In the example embodiments of FIGS. 1 and 2, Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

In the example embodiments of FIGS. 1 and 2, storage system 12 is shown to include one coded target (e.g., coded target 110). In other embodiments, the number of coded targets may be increased or decreased depending upon e.g. the level of redundancy/performance/capacity required. In further embodiments, examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

In most embodiments, the manner in which a storage system 1, such as storage system 12, is implemented may vary depending upon e.g. the level of redundancy/performance/capacity required. In certain embodiments, storage system 12 may be a RAID device in which server computer/controller 100 is a RAID controller card and storage targets 102, 104, 106, 108 and/or coded target 110 are individual "hot-swappable" hard disk drives. In other embodiments, a RAID device may include but is not limited to an NAS device. In further embodiments, storage system, such as storage system 12, may be configured as a SAN, in which server computer/controller may be e.g., a server computer and storage targets and/or coded target May be a RAID device and/or computer-based hard disk drive. Further still, one or more of storage targets and/or coded target may be a SAN.

In the example embodiments of FIGS. 1 and 2, storage system 12 is configured as a SAN and the various components of storage system 12 (e.g. server computer/controller 100, storage targets 102, 104, 106, 108, and coded target 110) may be coupled using the network infrastructure may include but are not limited to an Ethernet (e.g., Layer 2 or Layer 3) network, a fiber channel network, an InfiniBand network, or any other circuit switched/packet switched network.

In the example embodiments of FIGS. 1 and 2, Storage system 12 may execute all or a portion of data caching process 10. In these embodiments, the instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. In these embodiments, storage device 16 may include but is not limited to: a hard disk drive; a tape drive; an optical drive; a RAID device; a random access memory (RAM); a read-only memory (ROM); and all forms of flash memory storage devices.

In the example embodiments of FIGS. 1 and 2, various data requests (e.g. data request 20) may be generated. In certain embodiments, these data requests may be sent from client applications to a storage system. In other embodiments, when a server computer/controller is configured as an application server, data requests may be internally generated within server computer/controller. In other embodiments, examples of a data request may include but are not limited to a data write request (i.e. a request that content be written to a storage system) and data read request (i.e. a request that content be read from a storage system).

In some embodiments, a Server computer/controller may include input-output logic 122 (e.g., a network interface card), processing logic, and first cache system. In other embodiments, a first cache system may include but are not limited to a volatile, solid-state, cache memory system (e.g., a dynamic RAM cache memory system) and/or a non-volatile, solid-state, cache memory system (e.g., a flash-based, cache memory system).

In the example embodiments of FIGS. 1 and 2, during operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. In certain embodiments, processing logic may store content within a first cache system.

In the example embodiments of FIGS. 1 and 2, depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache).

In other embodiments, processing logic may calculate and store coded data on coded target (included within non-volatile, electromechanical memory system) that may allow for the regeneration of data lost/corrupted on one or more of storage targets. In further embodiments, if processing logic was included within a RAID controller card or a NAS/SAN controller, processing logic may calculate and store coded data on coded target 110. In alternative embodiments, if processing logic was included within e.g., an applications server, data array may calculate and store coded data on coded target.

In the example embodiments of FIGS. 1 and 2, examples of second cache system 128 may include but are not limited to a volatile, solid-state, cache memory system (e.g., a dynamic RAM cache memory system) and/or a non-volatile, solid-state, cache memory system (e.g., a flash-based, cache memory system). In the embodiments of FIGS. 1 and 2, the combination of second cache system 128 and non-volatile, electromechanical memory system 112 may form data array 130, wherein first cache system 126 may be sized so that the number of times that data array 130 is accessed may be reduced. In these embodiments, by sizing first cache system 126 so that first cache system 126 retains a quantity of data sufficient to satisfy a significant quantity of data requests (e.g., data request 20), the overall performance of storage system 12 may be enhanced. In certain embodiments, a first cache system may be a content-aware cache system.

In the example embodiments of FIGS. 1 and 2, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced.

As will be described below in greater detail, second cache system 128 may be a content-aware cache system.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in further embodiments, addition to being executed on server computer/controller 100, some or all of the instruction sets and subroutines of data caching process 10 may be executed by one or more processors (not shown) and one or more memory architectures (not shown) included within data array 130.

Referring to the example embodiments of FIGS. 1, 2, 3*a*, and 3*b*, data request 20 (e.g. data read request 116 and/or data write request 120) may be processed by server computer/controller 100 to extract pertinent information concerning these data requests. When data request 20 is a data write request (e.g., write request 116), write request 116 may include content 118 to be written to data array 130. Additionally, write request 116 may include a storage address 200 that defines the intended storage location within storage array 130 at which content 118 is to be stored. For example, storage address 200 may define a particular logical unit within data array 130 (e.g., a LUN or Logical Unit Number) and a particular storage address within that specific logical unit (e.g., an LBA or Logical Block Address) for storing content 118.

Concerning read request 120, these requests do not include any content to be written to data array 130, as these are read requests and concern content to be read from data array 130. Read request 120 may include a storage address 202 that defines the storage location within storage array 130 from which content is to be retrieved. For example, storage address 202 may define a particular logical unit within data array 130 (e.g., a LUN or Logical Unit Number) and a particular storage address within that specific logical unit (e.g., an LBA or Logical Block Address) for retrieving the content sought from data array 130.

Refer now as well to the example embodiment of FIG. 3*c*, data caching process 10 may maintain content directory 250, which may be used to locate various pieces of content within first cache system 126. In one particular embodiment of content directory 250, content directory 250 may include plurality of entries 252, wherein each of these entries may identify: data array storage address 200/202 (e.g. a logical storage unit and a storage address at which a specific piece of previously-written content is located within storage array 130); first cache address 254 (e.g., the location within first cache system 126 at which the specific piece of previously-written content is also located), and content identifier 256 for the specific piece of previously-written content. In other embodiments, content directory may identify the location of specific pieces of content included within a first cache system and their corresponding pieces of data within data array, as well as a content identifier that uniquely identifies the specific piece of content.

Referring again to the example embodiments of FIGS. 1-3*c*, Content identifier 256 may be used in a content-aware caching system and may, specifically, be a mathematical representation of the specific piece of previously-written content that may allow e.g. server computer/controller 100 to quickly determine whether two pieces of previously-written content are identical, as identical pieces of content would have identical content identifiers. In one particular embodiment, content identifier 256 may be a hash function (e.g., a cryptographic hash) of the previously-written content. Accordingly, through the use of a content-aware caching system, duplicate data entries within first cache system 126 and/or second cache system 128 may be quickly identified, avoided, and/or eliminated.

In certain embodiments, a hash function may be an algorithm/subroutine that maps large data sets to smaller data sets. In most embodiments, he values returned by a hash function may be typically called hash values, hash codes, hash sums, checksums or simply hashes. Usually, Hash functions are mostly used to accelerate table lookup or data comparison tasks such as e.g., finding items in a database and detecting duplicated or similar records in a large file.

General Read Request Processing:

During operation of server computer/controller 100, data caching process 10 may receive read request 120 on first cache system 126, wherein read request 120 identifies previously-written content (as defined by storage address 202) included within data array 130.

For example, assume that user 46 is using client application 22 to access data (i.e. content 132) that is currently being stored on data array 130. Accordingly, client application 22 may generate read request 120 which, as discussed above, may define a particular logical unit within data array 130 (e.g., a LUN or Logical Unit Number) and a particular storage address within that specific logical unit (e.g., an LBA or Logical Block Address) for retrieving content 132 sought from data array 130 by client application 22.

Assume that read request 120 defines LUN0/LBA5 as the location of content 132 within data array 130. Upon receiving read request 120, data caching process 10 may compare the location of content 132 within data array 130 (namely LUN0/LBA5) with each of the plurality of entries 252 defined within content directory 250 to determine if a copy of content 132 is locally available (i.e., cached) within first cache system 126. If LUN0/LBA5 was defined within content directory 250 (meaning that a local cached copy of content 132 is present/available within first cache system 126), that particular entry would also define a corresponding first cache address (e.g. first cache address 254) within first cache system 126 at which content 132 would be locally-available and retrievable from the first cache system 126. Conversely, in the event that LUN0/LBA5 is not defined within content directory 250 (meaning that a local cached copy of content 132 is not present/available within first cache system 126), data caching process 10 may need to obtain content 132 identified in read request 120 from data array 130.

In this particular example, since LUN0/LBA5 is not defined within content directory 250, a local cached copy of content 132 is not present/available within first cache system 126 and data caching process 10 will be need to obtain content 132 from data array 130.

Once content 132 is obtained by data caching process 10 from data array 130, data caching process 10 may store content 132 within first cache system 126 and may provide content 132 to client application 22, thus satisfying read request 120. Additionally, content directory 250 may be amended by data caching process 10 to include an entry (e.g., entry 258) that defines the data array storage address 200/202 (e.g. LUN0/LBA5); first cache address 254 (e.g., 111110), and content identifier 256 (e.g., ablccba) for content 132.

As discussed above, data array 130 may include second cache system 128. Accordingly, data caching process 10 may execute the above-described functionality with respect to second cache system 128.

General Write Request Processing:

During operation of server computer/controller 100, data caching process 10 may receive write request 116 on first cache system 126, wherein write request 116 identifies new content (e.g., content 118) to be written to data array 130.

For example, assume that user 46 is using client application 22 to create content (i.e. content 118) that is to be stored on data array 130. Accordingly, client application 22 may generate write request 116 which, as discussed above, may define a particular logical unit within data array 130 (e.g., a LUN or Logical Unit Number) and a particular storage address within that specific logical unit (e.g., an LBA or Logical Block Address) for storing content 118 within data array 130.

As discussed above and depending on the manner in which first cache system 126 is configured, data caching process 10 may immediately write content 118 to data array 130 (if first cache system 126 is configured as a write-through cache) or may subsequently write content 118 to data array 130 (if first cache system 126 is configured as a write-back cache).

Assuming that first cache system 126 in this example is configured as a write-through cache, data caching process 10 may immediately write content 118 to LUN0/LBA0 within data array 130 (as defined within write request 116). Additionally, data caching process 10 may locally-store content 118 within first cache system 126 and may amend content directory 250 to include an entry (e.g., entry 260) that defines the data array storage address 200/202 (e.g. LUN0/LBA0); first cache address 254 (e.g., 001011), and content identifier 256 (e.g., acdfcla) for content 118.

As discussed above, data array 130 may include second cache system 128. Accordingly, data caching process 10 may execute the above described functionality with respect to second cache system 128.

Content Aware Caching

As discussed above, content directory 250 may include a content identifier 256 that may be used in a content-aware caching system. A typical example of content identifier 256 may include but is not limited to a hash function of the content that content identifier 256 is associated with. Accordingly, through the use of content identifier 256 within a content-aware caching system, duplicate data entries within first cache system 126 and/or second cache system 128 may be quickly identified, avoided, and/or eliminated.

For example, upon receiving write request 116 and content 118, data caching process 10 may generate content identifier 256 for content 118. As discussed above, content identifier 256 generated for the content (i.e., content 118) identified within write request 116 may be a hash function (e.g., a cryptographic hash) of content 118.

Assume for illustrative purposes that write request 116 includes storage address 200 that defines the intended storage location for content 118 as LUN0/LBA0. Accordingly, upon receiving write request 116, data caching process 10 may generate content identifier 256 for content 118. Assume for illustrative purposes that data caching process 10 generates a hash of content 118, resulting in the generation of content identifier 256 (namely hash value acdfcla).

This newly-generated content identifier 256 (i.e. acdfcla) associated with content 118 may be compared to each of the other content identifiers (namely abalaby, alazchb, abalabz, alazcha) included within content directory 250 for first cache system 126 to determine if the newly-generated content identifier 256 (i.e. acdfcla) matches any of the other content identifiers (namely abalaby, alazchb, abalabz, alazcha) included within content directory 250.

As discussed above, each entry of the plurality of entries 252 included within content directory 250 is associated with a unique piece of content included within (in this example) first cache system 126. Accordingly, each unique content identifier included within content directory 250 may be associated with a unique piece of content written to (in this example) first cache system 126.

If, when performing this comparison, data caching process 10 does not identify a content identifier (i.e., abalaby, alazchb, abalabz, alazcha) within content directory 250 that matches the above-described, newly-generated content identifier (i.e. acdfcla), data caching process 10 may write content 118 to (in this example) first cache system 126 and may provide a copy of content 118 to data array 130 for storage within data array 130. Additionally, data caching process 10 may modify content directory 250 to include a new entry (i.e., entry 260) that defines the newly-generated content identifier (i.e. acdfcla), the location of content 118 within (in this example) first cache system 126 (i.e., 001011), and the location of content 118 within data array 130 (i.e., LUN0/LBA0).

If, when performing this comparison, data caching process 10 identified a content identifier within content directory 250 that matched the above-described, newly-generated content identifier (i.e. acdfcla), data caching process 10 would perform differently.

To illustrate how data caching process 10 would react if it found a matching content identifier, further assume for illustrative purposes that a second write request (i.e., write request 116') includes storage address 200' that defines the intended storage location for content 118' as LUN0/LBA2. Accordingly, upon receiving write request 116', data caching process 10 may generate content identifier 256 for content 118'. Assume for illustrative purposes that data caching process 10 generates a hash of content 118', resulting in the generation of content identifier 256 (namely hash value alazcha).

This newly-generated content identifier 256 (i.e. alazcha) associated with content 118' may be compared to each of the other content identifiers (namely abalaby, alazchb, abalabz, alazcha) included within content directory 250 for (in this example) first cache system 126 to determine if the newly-generated content identifier 256 (i.e. alazcha) matches any of the other content identifiers (namely abalaby, alazchb, abalabz, alazcha) included within content directory 250.

If, when performing this comparison, data caching process 10 does identify a content identifier (namely alazcha) within content directory 250 that matches the above-described, newly-generated content identifier (i.e. alazcha), data caching process 10 may perform a couple of functions.

For example, data caching process 10 may modify the entry (i.e., entry 262) within content directory 250 that is associated with the matching content identifier (i.e., alazcha) to include storage address 200' that defines the intended storage location for content 118' (i.e., LUN0/LBA2 within data array 130), thus generating modified entry 262'. Accordingly, modified entry 262' identifies that the pieces of content that are currently stored at LUN4/LBA7 and LUN0/LBA2 within data array 130 are identical. Accordingly, a single piece of cached content (located at first cache address 010111 within, in this example, first cache system 126) may be used as a local cached copy for both pieces of content stored on data array 130.

As discussed above, data array 130 may include second cache system 128. Accordingly, data caching process 10 may execute the above-described content aware functionality with respect to second cache system 128.

Deduplication

Figure 5:
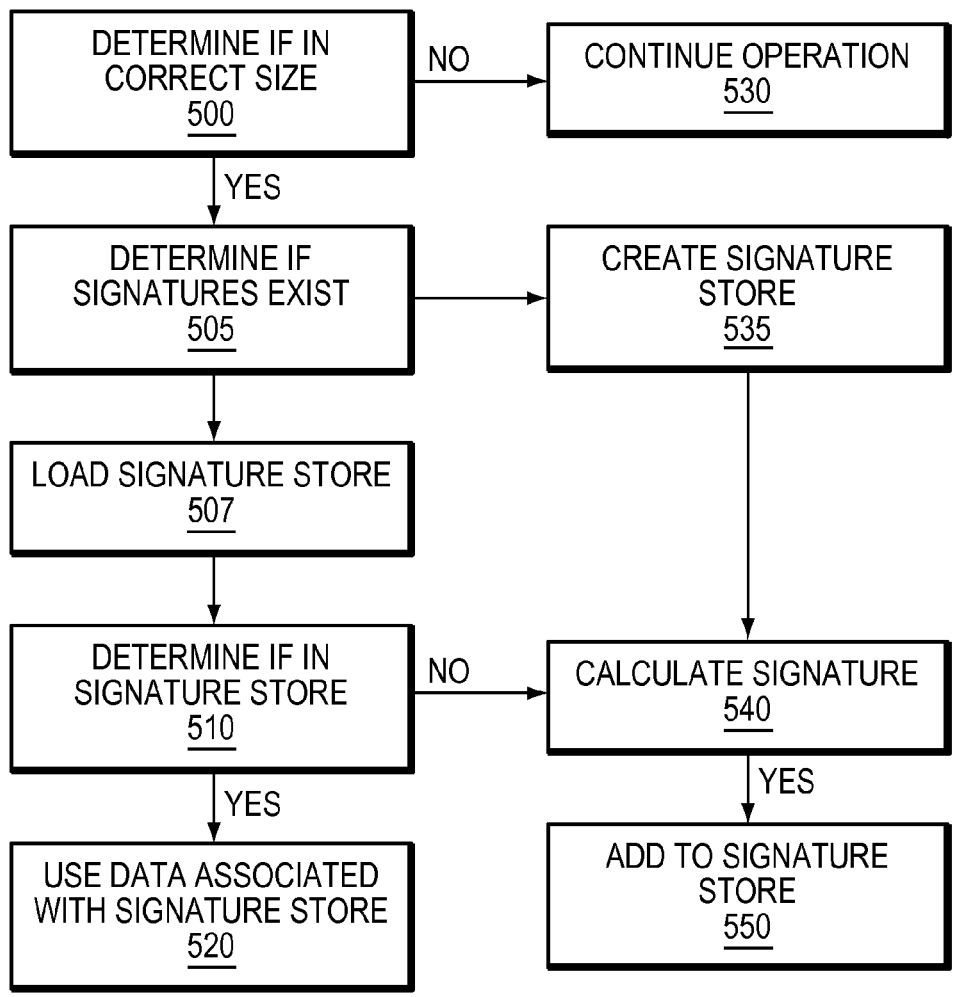
FIG. 5 is a simplified example of a method for determining if a signature exists for a file, in accordance with an embodiment of the present disclosure.

Refer now to the example embodiments of FIGS. 4 and 5. In the example embodiment of FIGS. 4 and 5, server 400 receives file request 405. In response to file request 405, it is determined whether the file requested is larger than a certain size (Step 500). If the file is large enough to have an attached signature file, the system checks if a signature file is available (step 505). If a signature file is available, the signature file or a portion the signature file is read into the cache system, i.e. content from metadata file 410, which contains signatures for files, is loaded into server cache 415 (step 507). It is determined whether metadata file 410 contains a full set of signatures for file 420 (step 510), which is the file that corresponds to file request 405.

If it is determined that metadata file 410 contains the full set of signatures for file 420, then the data associated with the signature may be used. If not, the missing signatures may be calculated by a background process and updated in file 410, if the signatures which already exist in signature file 410 may be use. In these embodiments, the data has previously been loaded to server cache 415 and this may prevent the data associated with File 420 from having to be read from data storage system 425, which may have another copy of the data associated with file 420 stored on storage 430 as part of file 435. As well, in these embodiments, the signature for the file does not need to be calculated again as the signature in metadata file 410 is associated with file 420.

If the file was determined not to be of the appropriate file size, the file operation continues (step 530). If it was determined that signatures metadata file 410 does not exist, then the signatures file is created (step 535). Data from file 420 is used calculate a signature (step 540). The signature will be added to metadata file 410 (step 550). In certain embodiments the signature may be calculated in the background while signatures for newly written IOs are being calculated synchronously in the foreground. If the meta file 410 exist but is not completed, i.e. not all the signatures are calculated the background process for calculating the signatures may continue.

Figure 6:
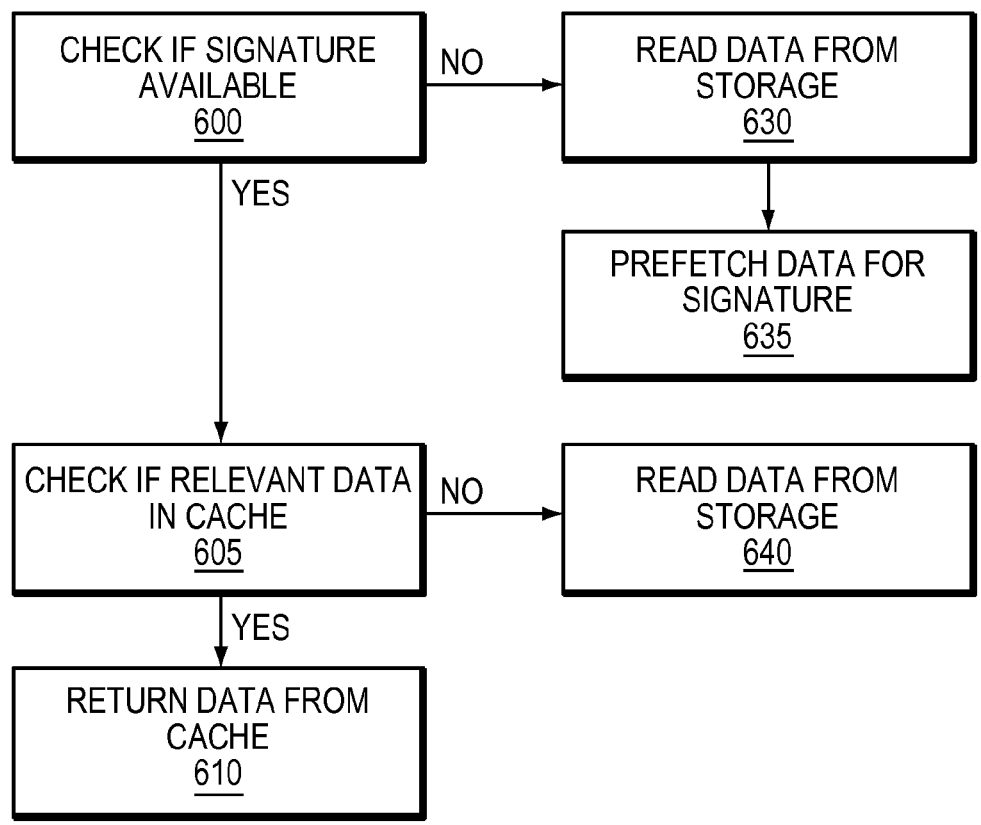
FIG. 6 is a simplified example of a method for getting data associated with a file, in accordance with an embodiment of the present disclosure.

Refer now to the example embodiment of FIG. 6. When new read IO arrives to the file opened it is checked if the signatures area of the read was already prefetched from the signature file (step 600). If the signature is available, a check occurs to see if the data which matches the signature in the cache (step 605). If the data is in the cache, the data is returned from cache (step 610). If the signature data is in the cache but data relevant for the signature is not cached data is read from disk and added to the cache (640). If the signature is not available in the cache, data is read from the storage (step 630) and the signatures of relevant area are being prefetched from the meta data file (step 635). In certain embodiments, if the meta data file does not contain entry for the data read, the content file is updated with the cache.

Figure 7:
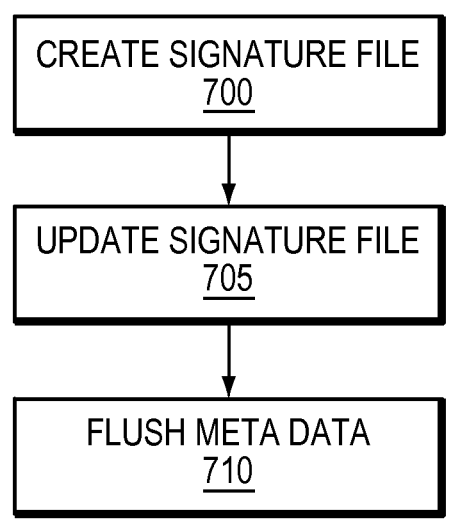
FIG. 7 is a simplified example of a method for updating a signature file, in accordance with an embodiment of the present disclosure.

Refer now to the example embodiment of FIG. 7, which illustrates creating and maintaining a signature file. A signature file may be created (step 700). Data is read from a file, a signature is calculated, and the signature is stored in the signature file (step 700). When new write to the file arrive the signatures for the file are being update for the location changes, but they are flushed to the meta data file periodically after a predetermined amount of time (step 705). The meta data file is flushed with the meta data when the file is closed (step 710). In some embodiments, signatures may be calculated in the background. In other embodiments, the signatures may be gathered from "regular" checking and accessed and updates as written.

Figure 8:
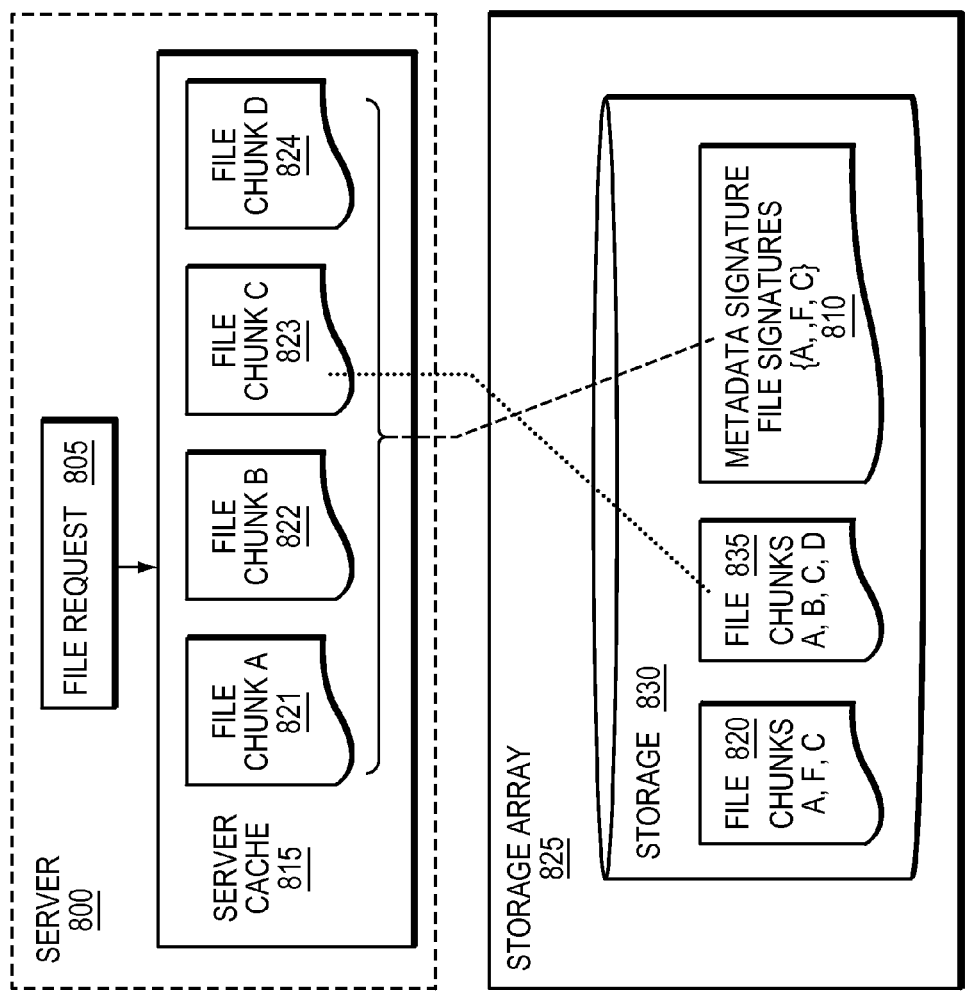
FIG. 8 is a simplified example of how the meta data file may be used to access cached data instead of accessing data from a storage array, in accordance with an embodiment of the present disclosure.
Figure 9:
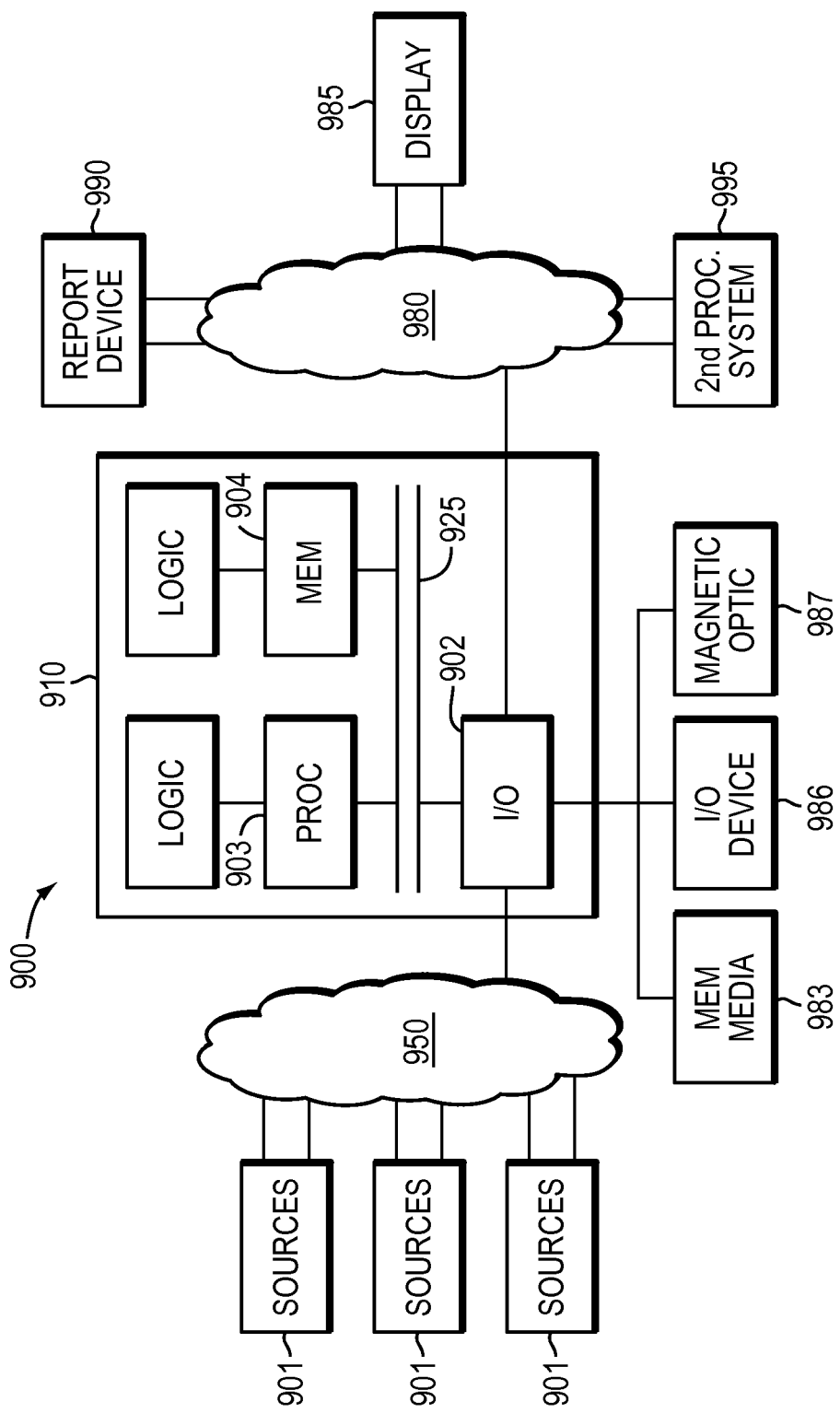
FIG. 9 is an example of an embodiment of an apparatus that may utilize the techniques described herein, in accordance with an embodiment of the present disclosure.

Refer now to the example embodiment of FIG. 8, which illustrates how the meta data file may be used to use cached data instead of accessing data from a storage array. In the example embodiment of FIG. 8, File 835 on storage 830 on storage array 825 is made of four chunks, ABCD. File Chunks A 820, B 822, C 823, and D 824, have previously been read into the cache. If there is a request for file 820, which is made of Chunks A, F, and C, metadata file 810 is use, meta data with signature for chunks with data A, F, C. Thus the caching system understands that data chunks A and F for file 820 are already in the cache and read for the first chunk for instance of file 820 would result in returning the data from the cache.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Figure 10:
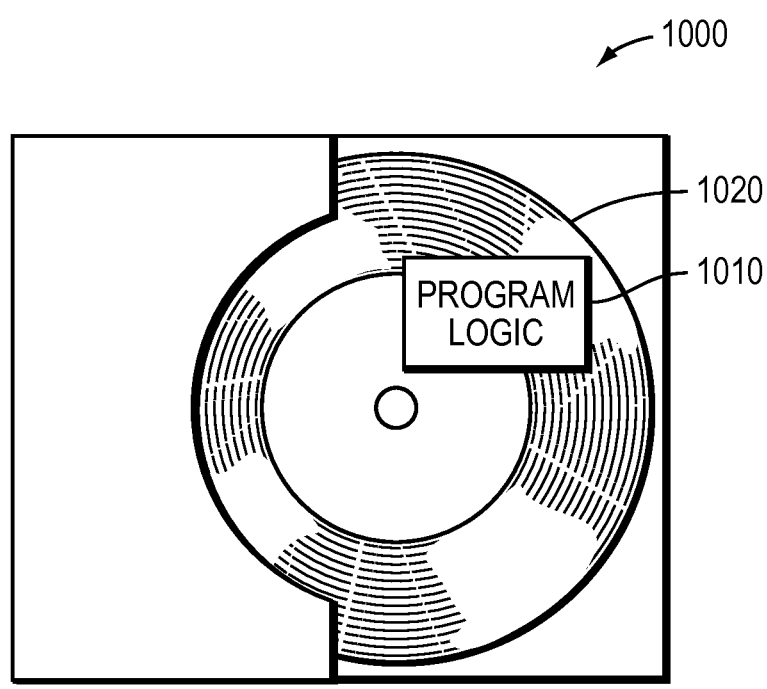
FIG. 10 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor 903 to provide a unique apparatus that operates analogously to specific logic circuits. As such a general purpose digital machine can be transformed into a special purpose digital machine. FIG. 10 shows Program Logic 1034 embodied on a computer-readable medium 1030 as shown, and wherein the Logic is encoded in computer-executable code configured for carrying out the reservation service process of this invention and thereby forming a Computer Program Product 900. The logic 1034 may be the same logic 940 on memory 904 loaded on processor 903. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIGS. 5-7.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A computer-implemented method comprising:
    determining if a requested file is greater than a predetermined size;
        based on a positive determination that the requested file is greater than the predetermined size, searching for an associated signature file for the file in a metadata file; wherein the metadata file is enabled to store signatures for a plurality of files; wherein the signatures correspond to chunks of the files; wherein for signature files stored in the metadata file, the metadata file records when a chuck of a file has the same signature as another chunk of another file; wherein the metadata file further enables the server cache to answer a request for an read IO to a chunk of a first file with a chunk a second file when the metadata file indicates the signatures of the chunks are the same; and
        if the associated signature file is found for the file, prefetching some or all the signatures from the associated signature for the file into a server cache.

2. The method of claim 1 further comprising:
    if the file is less than a predetermined size, continuing an operation associated with the file.

3. The method of claim 1 further comprising:
    if the signature file is not found, creating a signature file; and
    calculating a signature for the associated file.

4. The method of claim 1 further comprising:
    receiving a read request for a file, determining if a signature file exists for the file in a metadata file; wherein the metadata file is enabled to store signatures for a plurality of files; wherein the signatures correspond to chunks of the files; wherein for signature files stored in the metadata file, the metadata file records when a chuck of a file has the same signature as another chunk of another file; wherein the metadata file further enables the server cache to answer a request for an read IO to a chunk of a first file with a chunk a second file when the metadata file indicates the signatures of the chunks are the same;
    checking if the signature for the region being read is fetched to the server cache from the signature file;
    checking whether the signature matches data in the cache; and
    based upon positive a determination, serving the read request from the server cache.

5. The method of claim 4 further comprising:
    based upon a negative determination that the data matching the signature is in the server cache, reading data from the storage and adding the data from the server cache omitting the calculation of the signature.

6. The method of claim 4 further comprising:
based upon a negative determination that the signature for the area being read is in the server cache, reading the data from the storage and prefetching signatures for the area being read.

7. A system for data consistency, the system comprising:
a server with a server cache;
a storage array with storage; and
computer-executable logic operating in memory, wherein the computer-executable program logic is configured to enable one or more processors to execute:
determining if a file is greater than a predetermined size;
based on a positive determination that the file is greater than the predetermined size, searching for an associated signature file for the file in a metadata file; wherein the metadata file is enabled to store signatures for a plurality of files; wherein the signatures correspond to chunks of the files; wherein for signature files stored in the metadata file, the metadata file records when a chuck of a file has the same signature as another chunk of another file; wherein the metadata file further enables the server cache to answer a request for an read IO to a chunk of a first file with a chunk a second file when the metadata file indicates the signatures of the chunks are the same; and
if the associated signature file is found for the file, prefetching some or all the signatures from the associated signature for the file into the server cache.

8. The system of claim 7 wherein the computer logic is further configured to enable one or more processor to execute:
if the file is less than a predetermined size, continuing an operation associated with the file.

9. The system of claim 7 wherein the computer logic is further configured to enable one or more processor to execute:
if the signature file is not found, creating a signature file; and
calculating a signature for the associated file.

10. The system of claim 7 wherein the computer logic is further configured to enable one or more processor to execute:
receiving a read request for a file, determining if a signature file exists for the file;
checking if the signature for the region being read is fetched to the server cache from the signature file;
checking whether the signature matches data in the server cache; and
based upon positive a determination, serving the read request from the server cache.

11. The system of claim 7 wherein the computer logic is further configured to enable one or more processor to execute:
based upon a negative determination that the data matching the signature is in the server cache, reading data from the storage and adding the data from the server cache omitting the calculation of the signature.

12. The system of claim 7 wherein the computer logic is further configured to enable one or more processor to execute:
based upon a negative determination that the signature for the area being read is in the server cache, reading the data from the storage and prefetching signatures for the area being read.

13. A computer program product for use in ensuring consistency comprising:
a non-transitory computer readable medium encoded with computer executable program code for replication of data, the code configured to enable the execution of:
determining if a file is greater than a predetermined size;
based on a positive determination that the file is greater than the predetermined size, searching for an associated signature file for the file in a metadata file; wherein the metadata file is enabled to store signatures for a plurality of files; wherein the signatures correspond to chunks of the files; wherein for signature files stored in the metadata file, the metadata file records when a chuck of a file has the same signature as another chunk of another file; wherein the metadata file further enables the server cache to answer a request for an read IO to a chunk of a first file with a chunk a second file when the metadata file indicates the signatures of the chunks are the same; and
if the associated signature file is found for the file, prefetching some or all the signatures from the associated signature for the file into a cache.

14. The computer program product of claim 13 wherein the code is further configured to enable:
if the signature file is not found, creating a signature file; and
calculating a signature for the associated file.

15. The computer program product of claim 13 wherein the code is further configured to enable:
if the signature file is not found, creating a signature file; and
calculating a signature for the associated file.

16. The computer program product of claim 13 wherein the code is further configured to enable:
receiving a read request for a file, determining if a signature file exists for the file;
checking if the signature for the region being read is fetched to the cache from the signature file;
checking whether the signature matches data in the cache; and
based upon positive a determination, serving the read request from the cache.

17. The computer program product of claim 13 wherein the code is further configured to enable:
based upon a negative determination that the data matching the signature is in the cache, reading data from the storage and adding the data from the cache omitting the calculation of the signature.

18. The computer program product of claim 13 wherein the code is further configured to enable:
based upon a negative determination that the signature for the area being read is in the cache, reading the data from the storage and prefetching signatures for the area being read.

19. The method of claim 1 further comprising:
if the associated signature for the file is not found, calculating a signature for the file and adding it to the signature file.

20. The method of claim 19 wherein the calculating the signature is done as a background process.

* * * * *